3,118,125
UNDERWATER SOUND TRANSDUCER WITH
SEALED LIQUID COUPLING CHAMBER
Claude C. Sims, Orlando, Fla., assignor to the United
States of America as represented by the Secretary of
the Navy
Filed June 18, 1959, Ser. No. 821,335
7 Claims. (Cl. 340—12)
(Granted under Title 35, U.S. Code (1952), sec. 266)

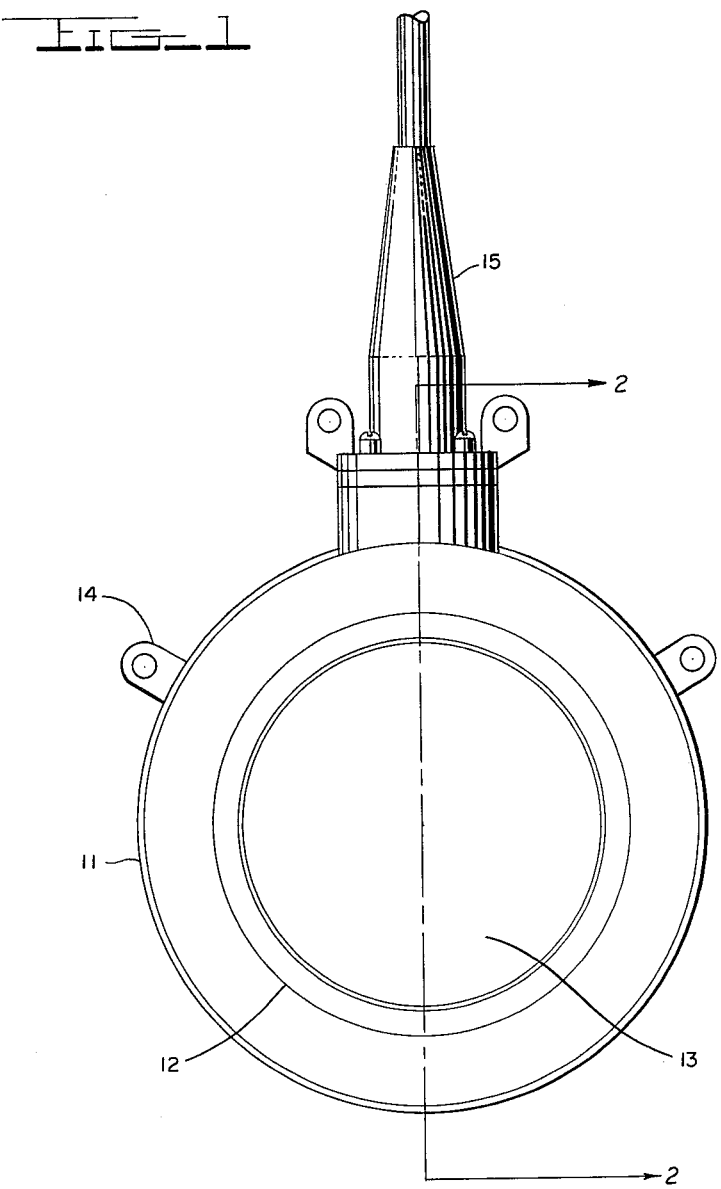

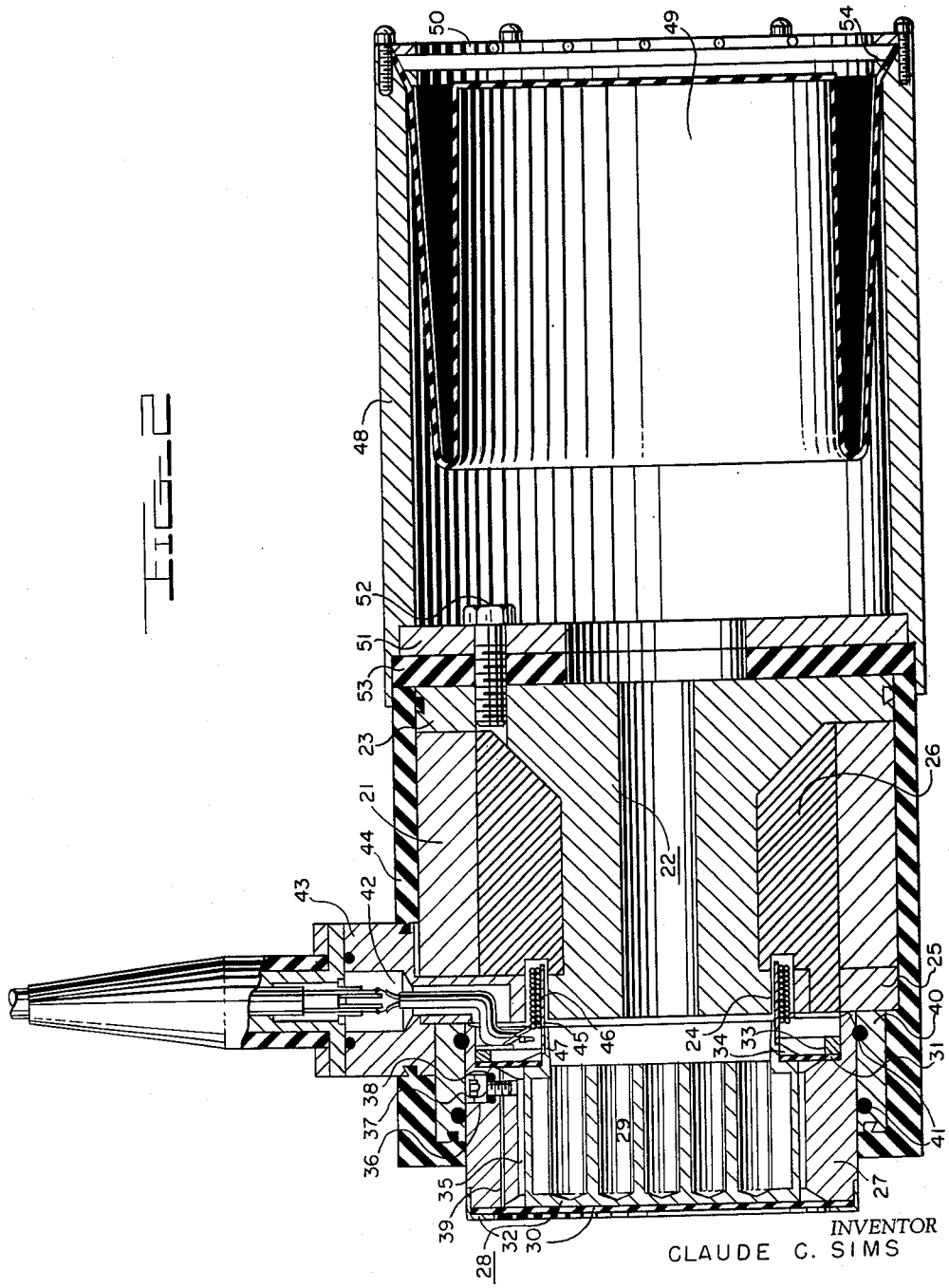

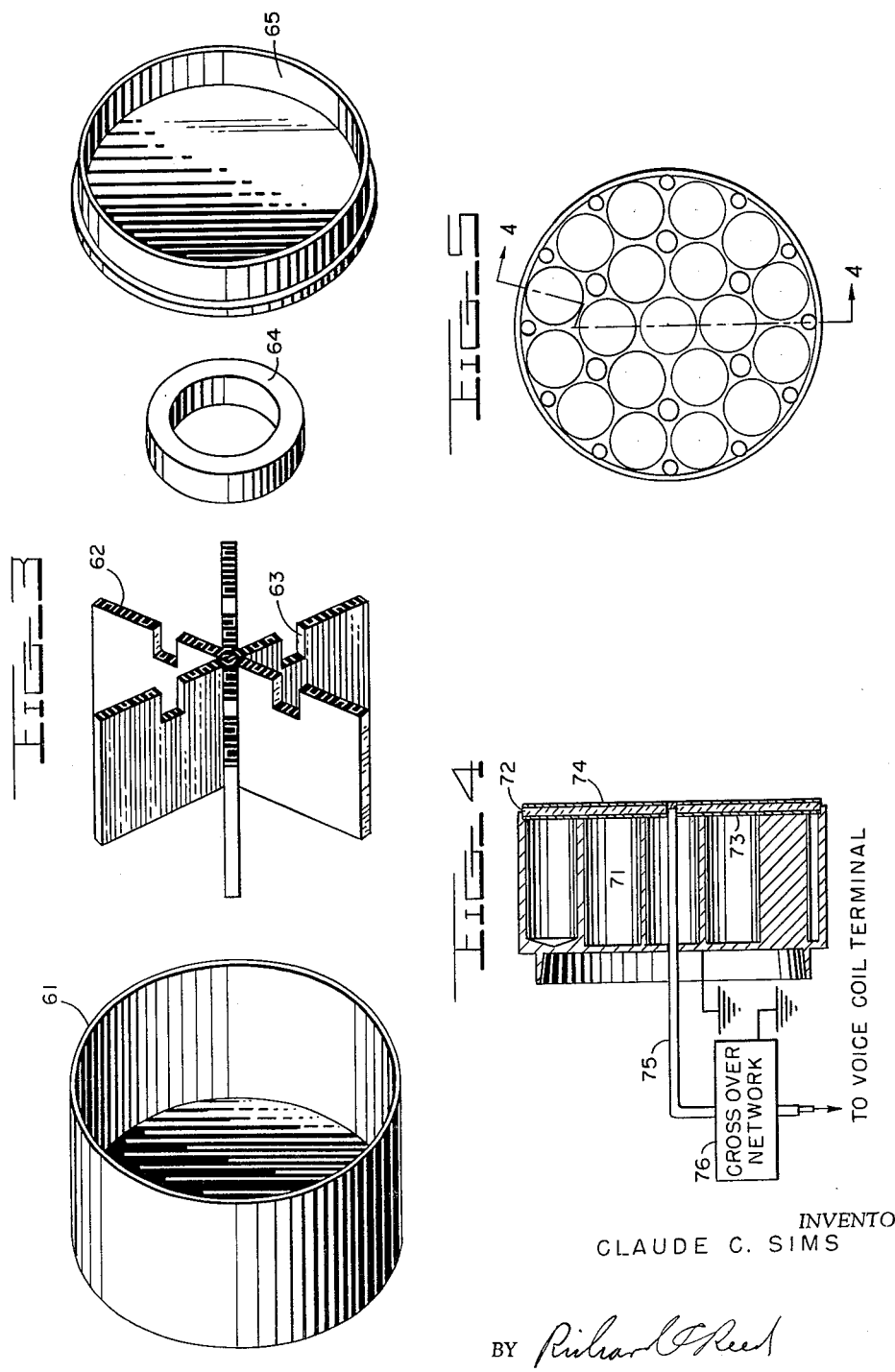

The invention described herein may be manufactured and used by or for the Government of the United States of America for governmental purposes without the payment of any royalties thereon or therefor.

The present invention relates to a sound transducer which is particularly useful for the efficient generation of sound waves in water.

Transducers developed prior to the conception of the one to be described have been limited to narrow bands of frequencies. As many as three transducers have been required to cover the range of frequencies for which the present invention is designed. In addition, these transducers have been oversized, heavy and difficult to disassemble and repair. In order to calibrate existing underwater sound systems, it is highly desirable to have a single compact unit to cover the entire frequency band.

An object of the present invention is, therefore, to provide an extremely broadband underwater sound transducer for calibrating sonar systems.

Another object of the invention is to provide a transducer which is lightweight and compact for greater portability.

A further object of the invention is to provide a transducer of the type described above which is easily disassembled for inspection and repair.

These and other objects of the invention will be better understood with reference to the accompanying drawings in which:

FIG. 1 shows a front view of a preferred embodiment of the transducer;

FIG. 2 shows a cutaway side view through section 2—2 of the structure shown in FIG. 1;

FIG. 3 shows an exploded view of a second embodiment of the diaphragm in FIG. 1; and FIGS. 4 and 5 show side and front views respectively, of a third embodiment of the diaphragm shown in FIG. 1 with portions cutaway or removed to show inner detail.

Referring to FIG. 1 there is shown a front view of the transducer. The device is enclosed in a generally cylindrical housing 11, one of which includes a smaller cylindrically shaped sub-assembly 12. The greater portion 13 of the front face of this sub-assembly is a sound radiating surface. The units is supported from a plurality of lugs 14 on the outer surface of the housing. Electrical signals are transmitted to or from the transducer through a waterproof cable 15.

In FIG. 2 the side view has been cutaway as indicated by the section lines 2—2 in FIG. 1 to show the inner details. The forward end of the transducer includes a permanent magnet 21 in the form of a toroidal ring, which may be formed of a material such as "Alnico V" for example. A back pole piece 22, also of toroidal shape is mounted within the permanent magnet spaced from the inner surfaces of the magnet with a mushroomed rear flange 23 connected to the rear face of the magnet. The forward end of the back pole piece terminates in a second ring shaped flange 24 ahead of the front surface of the magnets. A ring shaped front pole piece 25 is attached to the front face of the magnet with its inner surface spaced from the outer surface of the ring shaped flange to provide a toroidal air gap. The cavity between the magnet and the pole pieces is filled with pure lead 26. The lead strengthens the magnet structure and effectively damps out resonant vibrations which normally would occur within the operating band. The pole pieces are composed of low carbon magnetic iron.

Moving now to the components of the sub-assembly 12 from FIG. 1 which are found in FIG. 2, a diaphragm housing ring 27 is mounted coaxially on the front face of the front pole piece to provide a rigid forward wall for the overall housing. This member is preferablly made from stainless steel to resist the corrosive attack of sea water. Within and spaced from the housing ring is a lightweight cylindrical diaphragm 28 made from a material such as magnesium. The mass of the diaphragm is reduced with a minimum loss of rigidity by drilling a honeycomb of cavities 29 in the rear face of this member. The diaphragm is supported by a thin circular sheet 30 of rubber or other resilient material which is bonded to the front faces of the diaphragm and the diaphragm housing ring. Any suitable bonding agent may be used, synthetic adhesives of the thermosetting type being preferred. A second thin rubber sheet in the shape of a washer 31 is bonded in a similar manner to the rear faces of the same elements, so that the rubber sheets provide end seals for an annular coupling chamber 35 defined by the inner and outer surfaces of the diaphragm housing ring and the diaphragm, respectively. A stainless steel cap ring 32 is bonded to the housing ring and the front seal or rubber sheet 30 and two brass sealing rings 33 and 34 are similarly bonded to the housing ring and the rear seal or washer 31 for reinforcement. The second rubber sheet may be secured with a thermoplastic cement designed to bond rubber to metal.

To complete the sub-assembly the annular coupling chamber 35 is filled with a suitable fluid as, for example, silicone oil having a viscosity of 80 centistokes at 100° F. Three filling holes 36 are provided for filling the chamber, each with a screw closure 37 and an O-ring seal 38. A small passageway 39 is provided through the housing ring 27 intersecting the filling hole to prevent air from becoming trapped between the seals and the housing ring. The dimension of the diaphragm or the housing ring normal to the seals is many times the radial dimension of the coupling chamber at the front face of the transducer, so that the oil filling provides a high acoustic impedance to vibrations in the medium in which the transducer operates.

The housing ring 27 is fastened to the front pole piece 25 by means of a brass retaining ring 40 which is silver soldered to the pole piece. The inner surface of the retaining ring has two circumferential grooves each of which is fitted with an O-ring seal 41. The outer surface of the housing ring includes a circumferential groove which snaps over the lower O-ring to secure the housing ring and retainer. The contacting surfaces between these seals is coated with silicone grease.

The input leads 42 to the transducer are brought in through a stainless steel connector 43 attached to the outer surface of the permanent magnet assembly. The magnet contains an aperature for threading these leads into the transducer to a voice coil assembly. The external surfaces of the magnet assembly and the retaining ring are coated with a layer 44 of butyl rubber.

The voice coil assembly includes a coil form 45 on which is wound 34 A.W.G. insulated copper wire 46. The coil form is a thin strip of brass bent in a circle and cemented to the circular coil form support 47 projecting from the rear of the diaphragm. The length of the strip is slightly less than the circumference of the coil form support to provide a gap, not shown, in the coil form which inhibits eddy currents. A bottom layer of 60 turns and a top layer of 55 turns are wound on the form and covered with a suitable protective coating.

The rear portion of the transducer housing includes a rigid cylindrical compensating housing portion 48, preferably stainless steel with a resilient rear wall. The resilient wall is formed by a compensating bag 49 which extends into the housing and preferably is formed from a thin sheet of butyl rubber. The edge of the bag is cemented to the rear of the compensating housing and a reinforcing ring 54 cemented thereon to provide an airtight seal. A sieve-like guard member 50 is mounted behind the compensating bag on the rigid housing to prevent foreign objects from entering this portion of housing and possibly damaging the bag. The front wall 51 of this portion of housing is formed in the shape of a washer with its peripheral edges welded or soldered to the front edges of the compensating housing. The front wall may be brass or any suitable rigid material.

In the completed transducer the front wall of the compensating housing is fastened to the back pole piece by a plurality of bolts 52. A butyl rubber gasket 53 is interposed between the pole piece and the front wall. The interior of the transducer is filled with air or other suitable gas.

When the transducer is operated under water, the water pressure is transmitted through the compensating bag and the gas in the housing to the rear face of the diaphragm, so that the pressure on both sides of the diaphragm is equalized. The honeycombed diaphragm structure prevents a condition known as "break-up" at high frequencies. The low mass and stiffness of the diaphragm assembly provide excellent frequency response from 40 to 20,000 cycles/sec. The design of the complete transducer housing reduces back-radiation to a minimum.

FIG. 3 shows in exploded form an alternate structure of the piston diaphragm 28 in FIG. 1. The alternate structure includes a thin walled cup shaped member 61. A vaned stiffener 62 is inserted into the cup member and secured as by soldering. Each of the vanes includes a notch 63 which is situated at the open end of the cup member to receive a stiffening ring 64. A coil form support 65 is secured to the rear edges of the vanes the stiffening ring and the cup member to form a rigid unit. All parts are machined from a lightweight material such as magnesium.

FIGS. 4 and 5 show still another diaphragm structure. FIG. 4 is a section view taken along the section lines 2—2 in FIG. 5. The crystal 72 of FIG. 4 is removed in FIG. 5 to show inner details. This diaphragm is similar to that shown in FIG. 2, although one skilled in the art can easily incorporate the features shown in FIG. 3, if desired. Instead of having a honeycomb structure in the rear of the FIG. 4 diaphragm, a network of holes 71 is drilled into the front face. This face is then covered with a piezoelectric crystal 72, as for example one or more lithium sulphate crystals with suitable electrodes 73 and 74 applied thereto in a conventional manner well known in the art. The electrodes are electrically connected in parallel with the terminals of the voice coil, not shown in FIG. 4. By connecting one terminal of the voice coil directly to the diaphragm, contact is made with electrode 73. The coil terminal insulated from the diaphragm is connected to electrode 74 with an insulated conductor 75. Other electrical connections obviously can be employed. A cross-over network 76 may also be employed to distribute the signal frequencies between the crystals and voice coil, if desired, in accordance with principles well understood in the art. The crystal is cemented in place by a suitable adhesive such as epoxy resin. With such a crystal motor the response of the transducer may be extended to 80,000 cycles/sec. or more.

Obviously many modifications and variations of the present invention are possible in the light of the above teachings. It is therefore to be understood that within the scope of the appended claims the invention may be practiced otherwise than as specifically described.

What is claimed is:

1. An underwater transducer comprising: an airtight gas filled housing including a rigid forward wall, a flexible rear wall, and at least one side wall interconnecting said forward and rear walls, said forward wall having inner and outer faces and an aperture therein bounded by an internal face extending between said inner and outer faces and a thin sheet of rubber attached to said outer face and covering said aperture; a rigid piston with a driving wall and a flange wall extending from the edge of said driving wall, said piston being positioned within said aperture with said driving wall cemented to said rubber sheet and said flange wall spaced from said internal face a short distance compared to the thickness of said forward housing wall to define a peripheral chamber; a rubber seal attached to the inner face of said forward housing wall and said flange wall forming a fluidtight closure for said chamber; a fluid medium filling said chamber; motor means mounted in said housing and coupled to said piston for vibrating said piston normal to said driving wall and a compressible gas filling the interior of said housing.

2. The transducer according to claim 1 wherein said piston includes a plurality of stiffening ribs interconnecting said driving and flange walls.

3. The transducer according to claim 1 wherein said motor means comprises a magnet attached to said housing having an air gap near said piston and a coil mounted on said piston extending into said air gap.

4. The transducer according to claim 1 wherein said driving wall comprises at least one-piezoelectric crystal.

5. The transducer according to claim 1 wherein said motor means includes a toroidal magnet of U-shaped cross-section, the ends of the legs of the U defining an air gap therebetween, a toroidal lead filling occupying the remaining space between said legs, and a coil mounted on said piston and within said air gap.

6. In combination: a sound transducer including a walled housing having interior and exterior surfaces, one wall of said housing having an aperture therein bounded by an internal face; a piston within said aperture having front and rear faces interconnected by an edge surface, said edge surface being spaced from said internal face less than the thickness of said wall; a first thin rubber sheet cemented to said front face and said exterior surface closing said aperture; a second thin rubber sheet cemented to said rear face and interior surface, providing a sealed chamber between said first and second sheets; a fluid medium filling said chamber and motor means mounted on said interior surface of said housing to vibrate said piston normal to said exterior surface.

7. The transducer according to claim 6 wherein said piston includes a number of individual spaced cavities of circular cross section opening into said interior surface and extending more than halfway through said piston, whereby its mass is greatly diminished without loss of rigidity.

References Cited in the file of this patent

UNITED STATES PATENTS

| | | |
|---|---|---|
| 1,985,005 | Wiebush | Dec. 18, 1934 |
| 2,037,165 | Harrison et al. | Apr. 14, 1936 |
| 2,116,522 | Kunze | May 10, 1938 |
| 2,390,847 | Olson | Dec. 11, 1945 |
| 2,405,179 | Black et al. | Aug. 6, 1946 |
| 2,490,595 | Merten | Dec. 6, 1949 |
| 2,503,243 | Cohen | Apr. 11, 1950 |
| 2,897,475 | Harris | July 28, 1959 |

FOREIGN PATENTS

| | | |
|---|---|---|
| 705,100 | Great Britain | Mar. 10, 1954 |
| 763,727 | Great Britain | Dec. 19, 1956 |

OTHER REFERENCES

Sims, C. L., "High-Fidelity Underwater Sound Transducers," Proc. IRE (TK5700 17), May 1959, Part I, vol. 47, No. 5, pages 866–871.